US009489730B2

(12) United States Patent
Doettling et al.

(10) Patent No.: US 9,489,730 B2
(45) Date of Patent: Nov. 8, 2016

(54) METHOD AND DEVICE FOR SAFEGUARDING A HAZARDOUS WORKING AREA OF AN AUTOMATED MACHINE

(71) Applicant: Pilz GmbH & Co. KG, Ostfildern (DE)

(72) Inventors: Dietmar Doettling, Ostfildern (DE);
Thomas Pilz, Ostfildern (DE);
Ruediger Frank, Ostfildern (DE);
Mark Hufnagel, Ostfildern (DE)

(73) Assignee: PILZ GMBH & CO. KG, Ostfildern (DE)

( * ) Notice: Subject to any disclaimer, the term of this patent is extended or adjusted under 35 U.S.C. 154(b) by 0 days.

(21) Appl. No.: 14/468,445

(22) Filed: Aug. 26, 2014

(65) Prior Publication Data
US 2015/0049911 A1 Feb. 19, 2015

Related U.S. Application Data

(63) Continuation of application No. PCT/EP2013/054833, filed on Mar. 11, 2013.

(30) Foreign Application Priority Data

Mar. 16, 2012 (DE) ........................ 10 2012 102 236

(51) Int. Cl.
*G06K 9/00* (2006.01)
*G06T 7/00* (2006.01)
(Continued)

(52) U.S. Cl.
CPC .............. *G06T 7/0004* (2013.01); *F16P 3/142* (2013.01); *G06K 9/00369* (2013.01);
(Continued)

(58) Field of Classification Search
None
See application file for complete search history.

(56) References Cited

U.S. PATENT DOCUMENTS 6,778,092 B2 8/2004 Braune
7,623,031 B2 11/2009 Haberer et al.
(Continued)

FOREIGN PATENT DOCUMENTS

DE 20 2004 020 863 U1 5/2006
DE 10 2005 003 827 A1 7/2006
(Continued)

OTHER PUBLICATIONS

English language translation of International Preliminary Report on Patentability (Chapter 1); issued by WIPO Sep. 16, 2014; 15 pp.
(Continued)

*Primary Examiner* — Stephen R Koziol
*Assistant Examiner* — Sean Conner
(74) *Attorney, Agent, or Firm* — Harness, Dickey & Pierce, P.L.C.

(57) ABSTRACT

A method and device for safeguarding a hazardous working area includes a camera system for generating successive 3-D images of the working area, and an evaluation unit comprising a fail-safe foreign object detector, a classifier, a person tracker and a comparator. The foreign object detector generates a first signal comprising a first item of position information, representative of the position of a foreign object in the protection zone. The classifier attempts to identify the foreign object as a person. The person tracker tracks an identified person using a series of current 3-D images and, after each new 3-D image, determines a second item of position information representing the current position of the identified person. If the position of the foreign object according to the first item of position information and the position of the identified person are different from one another, a control signal for stopping the machine is generated.

14 Claims, 3 Drawing Sheets

(51) Int. Cl.
  *F16P 3/14*   (2006.01)
  *G06K 9/32*   (2006.01)
  *G06K 9/62*   (2006.01)
  *G06T 7/20*   (2006.01)

(52) U.S. Cl.
  CPC ......... *G06K 9/3241* (2013.01); *G06K 9/6267* (2013.01); *G06T 7/2086* (2013.01); *G06K 2209/19* (2013.01); *G06T 2207/10012* (2013.01); *G06T 2207/30164* (2013.01)

(56) References Cited

U.S. PATENT DOCUMENTS

| | | | |
|---|---|---|---|
| 7,652,238 | B2 | 1/2010 | Haberer et al. |
| 2005/0207618 | A1* | 9/2005 | Wohler ............... B25J 9/1674 382/103 |
| 2009/0015663 | A1* | 1/2009 | Doettling ............ F16P 3/14 348/46 |
| 2009/0222134 | A1 | 9/2009 | Franke et al. |
| 2009/0237499 | A1 | 9/2009 | Kressel et al. |
| 2011/0103647 | A1* | 5/2011 | Leopold ............... G08G 1/015 382/103 |
| 2012/0146789 | A1* | 6/2012 | De Luca ............... G08B 21/12 340/540 |

FOREIGN PATENT DOCUMENTS

| | | |
|---|---|---|
| DE | 10 2006 008 805 A1 | 9/2007 |
| DE | 10 2006 048 166 A1 | 2/2008 |
| DE | 10 2007 007 576 A1 | 8/2008 |
| DE | 10 2009 031 804 A1 | 3/2010 |
| DE | 10 2010 017 857 A1 | 10/2011 |
| EP | 1 306 603 A2 | 5/2003 |
| EP | 1 418 380 A1 | 5/2004 |
| EP | 1 543 270 | 6/2005 |
| EP | 1 586 805 A1 | 10/2005 |
| EP | 1 635 107 A1 | 3/2006 |
| EP | 1 635 108 A1 | 3/2006 |
| EP | 2 282 106 A1 | 2/2011 |
| WO | WO 2004/029502 A1 | 4/2004 |
| WO | WO 2007/079883 A2 | 7/2007 |
| WO | WO 2008/014909 A1 | 2/2008 |

OTHER PUBLICATIONS

EN 954-1; Safety-related parts of control systems—Part 1: General principles for design; Mar. 1997; 34 pp.
EN ISO 138849-1; Safety of machinery—Safety-related parts of control systems—Part 1: General principles for design (ISO 13849-1:2006); Nov. 2006; 97 pp.
CEI IEC 61508-2; Functional safety of electrical/electronic/programmable electronic safety-related systems—Part 2: Requirements for electrical/electronic/programmable electronic safety-related systems; May 2000; 152 pp.
ISA/EP; International Search Report; mailed Jun. 26, 2013; 11 pp.

* cited by examiner

METHOD AND DEVICE FOR SAFEGUARDING A HAZARDOUS WORKING AREA OF AN AUTOMATED MACHINE

CROSS-REFERENCE TO RELATED APPLICATIONS

This application is a continuation of international patent application PCT/EP2013/054833, filed on Mar. 11, 2013 designating the U.S., which international patent application has been published in German language and claims priority from German patent application DE 10 2012 102 236.4 filed on Mar. 16, 2012. The entire contents of these priority applications are incorporated herein by reference.

BACKGROUND OF THE INVENTION

The present invention relates to a method and a device for safeguarding a hazardous working area of an automated machine. More particularly, the invention relates to a method and a device in which a respective current 3-D image of the working area is recorded and evaluated in order to avoid a risk to persons entering the working area.

Traditionally, the hazardous areas of automated machines are closed off with mechanical barriers in the form of protective fences and guard doors and using light barriers, light grids and laser scanners. As soon as a person opens a guard door or interrupts a light grid or a light barrier, a switch-off signal is generated and is used to stop the hazardous working movement of the machine. However, the installation of such protective devices is rather complicated and the protective devices require a large amount of space around a hazardous machine. In addition, such protective devices are not very flexible when it comes to adapting the safeguarding of the hazardous working area to different operating situations of the machine.

In order to avoid these disadvantages, efforts have been made for some time to safeguard the hazardous working area of an automated machine using camera systems and suitable image processing. US 2005/207618 A discloses such a system having at least two cameras which cyclically provide images of the hazardous working area. The images from the cameras are analyzed using at least two algorithmically different methods, and the hazardous working movement of the machine is stopped if at least one of the two methods detects a foreign object in a previously defined protection zone. Each of the two analysis methods generates 3-D information from the images of the cameras, with the result that the position of objects in the defined protection zone can be determined using the methods. A great challenge for such methods and devices is that the image processing, which is already complex anyway, must be fail-safe in terms of relevant machine safety standards, in particular EN 954-1 (already expired), EN ISO 13849-1 and IEC 61508, in order for such a device to be allowed for actual use safeguarding a hazardous machine. Failure of the device itself must not result in the safeguarding of the machine being lost. A device which achieves at least category 3 according to EN 954-1, SIL 2 according to IEC 61508 and/or performance level PL (d) according to EN ISO 13849 is therefore considered to be fail-safe in the following.

The method known from US 2005/207618 A and a corresponding device can achieve this and have already proved themselves in practical use. However, the known device has hitherto been able to detect only whether a foreign object is situated in a previously defined protection zone in order to slow down or stop a hazardous machine movement on the basis thereof. Man-machine interaction in the immediate vicinity of man and machine and flexible adaptation to changing operating situations and/or on the basis of the type of foreign object, are not readily possible with the known device. There is therefore a desire to further develop the known method and the corresponding device in order to enable, in particular, man-robot collaboration (human-robot interaction) inside the hazardous working area of a robot. For example, it is desirable for a person to be able to stay in the fundamentally hazardous working area of the robot while the robot is operating in order to monitor the machining processes of the robot in situ or to machine a workpiece at the same time or alternately with the robot. Nevertheless, it must still be ensured that the person is not injured by working movements of the robot.

DE 10 2007 007 576 A1 proposes a method and a device for safeguarding the hazardous working area of a robot, wherein a 3-D image of the working area is created and a kinematized human model is assigned to a person inside the working area. The 3-D image is analyzed in order to determine whether the actual state of the working area differs from a desired state of the working area, in which case the desired position of the person is taken into account using the kinematized human model. This method and the corresponding device are intended to enable man-robot collaboration. However, on account of the desired/actual comparison, a person in the working area of the robot must move in a manner exactly corresponding to the desired state in the kinematized human model. Corresponding modeling appears to be complicated and in any case limits flexibility since adaptation to new operating situations requires new modeling in each case. In addition, although DE 10 2007 007 576 A1 proposes the use of scanners as sensor units, which have single fail-safety according to category 3 of EN 954-1, cyclical or continuous checking of the functionality of the sensor units is also proposed and the movements of the robot during the checking phase are intended to be monitored using reliable technology, for example by redundantly detecting and evaluating the axial positions of the robot system. However, DE 10 2007 007 576 A1 does not contain any indication that the evaluation of the 3-D images and the underlying modeling can provide the fail-safety required for safeguarding hazardous working areas.

DE 10 2005 003 827 A1 discloses a similar device and a corresponding method for interaction between a person and a robot, wherein a model-based approach is also proposed here. The method described appears to be very computation-intensive and complex, and it is therefore doubtful whether the fail-safety and reaction speed required for the intended purpose can be achieved with modern computer performance.

DE 10 2009 031 804 A1 describes a method for detecting and tracking objects. DE 10 2006 048 166 A1 describes a method for observing a person in an industrial environment. In both cases, man-machine interaction is proposed as a possible field of application. However, none of the methods provides the fail-safety required for this intended purpose.

DE 20 2004 020 863 U1 describes a device for safeguarding a hazardous working area of a machine, the device comprising, on the one hand, light grids which detect when a person enters the working area with a high degree of fail-safety. The device also comprises a laser scanner which scans the working area behind the light grids in a horizontal plane. The laser scanner is designed to determine the position of a detected object. The light grids and the laser scanner are coupled in such a manner that the machine is stopped if a light grid has been interrupted and the laser scanner then does not detect a foreign object in a section of the working area which has been classified as less hazardous.

SUMMARY OF THE INVENTION

Against this background, it is an object of the present invention to provide a method and a device of the type mentioned at the outset which, in the simplest and most efficient manner possible, make it possible for persons to flexibly stay in the hazardous working area of an automated machine, but with the safeguarding of the machine required for such a use and the required fail-safety being ensured.

According to a first aspect of the invention, there is provided a method for safeguarding a hazardous working area of an automated machine, comprising the steps of: providing at least one sensor unit which provides a respective current 3-D image of the working area at defined intervals of time, defining at least one protection zone in the working area, cyclically monitoring the protection zone using a fail-safe foreign object detector which generates a first signal on the basis of the respective current 3-D image and the defined protection zone if a foreign object is detected in the protection zone, the first signal comprising a first item of position information which is representative of a position of the foreign object in the protection zone, cyclically classifying the foreign object in the protection zone using a classifier, the classifier generating a second signal if the foreign object is identified as a person, wherein the machine is operated on the basis of the first signal and the second signal, tracking an identified person over a series of the respective current 3-D images using a person tracker, the person tracker determining, after each new 3-D image, a second item of position information which represents a current position of the identified person in the protection zone, and comparing the first and second items of position information, wherein the machine is stopped if the position of the foreign object according to the first item of position information and the position of the identified person according to the second item of position information are different from one another.

According to another aspect of the invention, there is provided a device for safeguarding a hazardous working area of an automated machine, comprising a sensor unit configured to generate a respective current 3-D image of the working area at defined intervals of time, comprising a configuration unit for defining at least one protection zone in the working area, and comprising an evaluation unit which has a foreign object detector, a classifier, a person tracker, a comparator and an output stage, wherein the foreign object detector has a fail-safe design and is configured to cyclically generate a first signal on the basis of a respective current 3-D image and on the basis of the defined protection zone if a foreign object is detected in the protection zone, the first signal comprising a first item of position information which is representative of a position of the foreign object in the protection zone, wherein the classifier is designed to cyclically generate a second signal if the foreign object is identified as a person, wherein the person tracker is designed to track an identified person over a series of the respective current 3-D images and, after each new 3-D image, to determine a second item of position information which represents a current position of the identified person in the protection zone, wherein the comparator is designed to compare the first and second items of position information and to generate a third signal on the basis thereof, and wherein the output stage is designed to generate a control signal for stopping the machine on the basis of the second signal and on the basis of the third signal, the control signal being designed to stop the machine if the position of the foreign object according to the first item of position information and the position of the identified person according to the second item of position information are different from one another.

It is particularly advantageous if the novel method and the novel device are implemented using a non-transitory data storage medium containing a computer program product having program code designed to carry out said method if the program code is executed on the evaluation unit. Accordingly, the foreign object detector, the classifier, the person tracker and the comparator are implemented in preferred exemplary embodiments in the form of software modules which are automatically executed in the evaluation unit.

The novel method and the novel device use a fail-safe foreign object detector which generates a defined first signal whenever a foreign object is in a previously defined protection zone inside the working area to be safeguarded. In preferred exemplary embodiments, a foreign object in this sense is any person and any object in the defined protection zone. In these exemplary embodiments, a defined protection zone must therefore be "empty" so that foreign object detection does not occur. However, in other exemplary embodiments, it is conceivable for particular objects which were already present when defining the protection zone, for example a switchgear cabinet or a supporting pillar of a factory building, to be accepted as known objects in the protection zone, with the result that only persons and objects which were not yet present in the protection zone when defining the latter are detected as foreign objects. In these cases, the foreign object detector can identify the foreign objects, for example, from the fact that they were not present in a reference image used for comparison.

In the preferred exemplary embodiments, the foreign object detector is only able to detect and determine the existence and the position of a foreign object in the protection zone. However, it is not able to classify the detected foreign object more precisely in terms of its individual properties, in particular to decide whether it is a person, a workpiece for the machine or another object. On the other hand, the foreign object detector is fail-safe in terms of the above definition. In one preferred exemplary embodiment, the foreign object detector is implemented using two 3-D analysis methods with diversified redundancy, as described in US 2005/207618 A mentioned at the outset. In the preferred exemplary embodiment, two different scene analysis methods are used and are each employed to evaluate image pairs from a stereo camera system. In another exemplary embodiment, a 3-D image evaluation method for the image pair from a stereo camera system can be combined with a time-of-flight measurement method of a scanner and/or a 3-D time-of-flight camera. In addition, the object detector may also be implemented with other sensor units and/or combinations of sensor units which provide an item of fail-safe position information for a foreign object detected in the protection zone.

In addition, the novel method and the novel device use a classifier and a person tracker. The classifier is able to decide whether or not a detected foreign object in the protection zone is a person. The person tracker tracks the position of an identified person over a series of the 3-D images recorded at the defined intervals of time and is therefore able to determine the position of the identified person for each current 3-D image. Since the person tracker presupposes the identification of the person for "its" position determination, the second item of position information may be different from the first item of position information.

This is precisely where a partial aspect of the invention comes in. This is because the comparator then compares the items of position information obtained, i.e. it compares the position information determined in a fail-safe manner for the unidentified foreign object and the further position information for the identified person. Due to the invention, the latter need not necessarily be in the form of fail-safe position information since the machine is already stopped if the position of the foreign object determined in a fail-safe manner and the second item of position information represent different positions. In other words, the fail-safe foreign object detector is used, inter alia, in the novel method and the novel device to verify the second item of position information using a fail-safe reference. On account of the comparison, the second item of personal position information is then also fail-safe even if the classifier and the person tracker per se are not fail-safe since a fault when determining the second item of position information on the basis of the comparison results in the hazardous machine being changed to a safe state.

The detection of a foreign object inside a defined protection zone and the fail-safe determination of its position are indeed already a demanding task. However, fail-safe classification and position determination for a previously identified person impose even higher demands on computing power, and a fail-safe implementation has at least not been known hitherto. However, by combining the fail-safe foreign object detection with classification and person tracking which are preferably not fail-safe, the novel device and the novel method are able to achieve the above-mentioned object. Person tracking makes it possible to allow the working movement of the hazardous machine even when a person is in the working area, provided that a current distance between the person and the machine still precludes immediate danger to the person. Since robots, for example, often require a very large working area but the robot is only in a part of the entire working area at a given time, the novel combination of foreign object detector and possibly non-fail-safe person tracker enables collaboration which is fail-safe and more flexible overall. In this case, the effort and costs for the practical implementation are lower than in an implementation which is fail-safe in all subcomponents. Therefore, the above-mentioned object is completely achieved.

In addition, the novel method and the novel device have the advantage that the computation-intensive classifier and person tracker can be implemented without additional fail-safe measures, which has an advantageous effect on the reaction times of the novel method and the novel device.

In a preferred refinement of the invention, the machine is also stopped if the classifier does not identify the foreign object as a person, wherein the machine is allowed to continue operation if the classifier identifies the foreign object as a person.

In this refinement, the classifier directly influences any stopping of the machine for safety reasons, namely if the foreign object is not identified as a person. However, in other refinements, it may be the case that the machine is stopped for other reasons even if the classifier has identified the foreign object as a person. This is not opposed to the refinement preferred here, but rather possibly supplements the latter. The stopping of the machine according to the refinement here makes it easier to ensure fail-safe operation even if persons enter the protection zone since the person tracker used requires the identification of a person. If the classifier does not identify the foreign object as a person, incorrect detection may be involved which is not intended to be tolerated for safety reasons. Alternatively, it is possible that the detected foreign object is not a person but rather, for example, an object which has fallen into the protection zone. Such an event is also not intended to be tolerated by the novel method and the corresponding device since it may jeopardize the safety of operators in the working area. For example, it would be conceivable for an unidentified foreign object to corrupt the determination of the first or second item of position information or for a robot movement to result in a hazardous situation only on account of the unidentified foreign object. The present refinement therefore contributes to improving the protection of operators in the working area of a machine in a simple manner. This applies, in particular, when the machine is stopped if a foreign object already previously identified as a person is no longer identified as a person after receiving a current 3-D image, which may be the case, for example, if a person carries an object into the working area and puts it down there.

In a further refinement, the classifier has a personal database containing personal data which characterize a number of selected persons, wherein the machine is only allowed to be operated if the classifier identifies the foreign object as one of the selected persons using the personal data.

In this refinement, the classifier not only detects whether the foreign object in the protection zone is actually a person, but rather the classifier may also detect whether it is a defined and known person. This refinement makes it possible to control the movement of the machine on the basis of whether an authorized maintenance person or operator or an unauthorized person, for instance, enters the protection zone. For example, this refinement can make it easier for an experienced machine operator to set up a workflow, while the entry of an unknown and/or unauthorized person is indicated by means of optical and/or acoustic warning signals and the machine is stopped in order to avoid endangering the unknown person. This refinement can be advantageously combined with a further refinement, according to which a plurality of spatially staggered protection zones are defined in the working area. An outer protection zone can then be used to trigger a warning or alarm signal, whereas the machine can continue to be operated and is stopped only when the unknown person enters an inner protection zone. It goes without saying that protection zones staggered in this manner can also be used in other advantageous refinements, in particular if the entry of a person in an outer protection zone is not intended to result in the machine being stopped but rather is only intended to result in a decelerated working movement and only entry in an inner protection zone results in stopping.

In a further refinement, the classifier has a parts database containing parts data which characterize a number of selected parts, wherein the machine is continued to be operated if the classifier identifies the foreign object as a part which can enter the protection zone using the parts data.

This refinement enables advantageous muting and/or blanking, i.e. the feeding of workpieces or other parts which are required during the normal workflow of the machine, without having to stop the machine. The refinement per se already provides an advantage but can also be combined with the above-mentioned refinement, according to which the machine is stopped if the classifier does not identify the foreign object as a person. It goes without saying that, when these refinements are combined, the identification of the foreign object as a selected part does not result in the machine being stopped if the foreign object not identified as a person is one of the selected parts. In some exemplary embodiments, the parts are identified using so-called template matching. In this case, images and/or characteristic features of images of the selected parts are compared with corresponding images and/or features of the detected foreign object. The part is deemed to be identified if there is sufficient identity.

In a further refinement, the classifier comprises a body part detector which is used to determine a position of body parts of the identified person.

In this refinement, the classifier is not only able to identify a person as a whole. It also makes it possible to identify individual body parts, in particular the limbs (arms, legs and/or hands). The identified body parts make it possible to increase the position resolution with respect to the identified person in order to thus detect, for example, whether or not the person is extending his arm in the direction of the machine. In preferred exemplary embodiments, the increased position resolution is advantageously used to determine and monitor a permissible minimum distance between the person and the machine. Accordingly, this refinement contributes to minimizing a "safety cover" around the machine. This facilitates direct man-machine collaboration. In this case, the body part detector benefits from the fail-safety of foreign object detection in the same way as the classifier and the person tracker since the position of the body part must also correspond to the position of the detected foreign object.

In a further refinement, the classifier and/or the person tracker has/have a non-fail-safe design.

In this refinement, the classifier and/or the person tracker per se does/do not meet the requirements imposed on fail-safety which must be met by the method and the device overall for the application described above. For example, the classifier and/or person tracker each per se does/do not meet the requirements according to SIL2 and/or PL(d) even though the method and the device overall meet these requirements. The refinement enables a relatively cost-effective implementation which is fast with respect to the processing speed and has short reaction times. It particularly benefits from the advantages of the novel method and the novel device explained above.

In a further refinement, the classifier is inactive until the foreign object detector detects a foreign object in the protection zone.

In this refinement, the foreign object detector as provides some sort of a trigger for starting and implementing the classifier and the person tracker. The classifier and the person tracker are not executed as long as there is no foreign object in the protection zone. The refinement has the advantage that the high computation power for the classifier and person tracker has to be called only if it is required for safeguarding purposes. As long as there is no foreign object in the protection zone, the computation power can be advantageously used for other purposes, for instance in order to operate the foreign object detector with a higher resolution and accordingly with higher positional accuracy. In addition, this refinement has the advantage that the classifier can already start with the known position of the foreign object, which dispenses with a complicated search algorithm in the classifier. This contributes to minimizing the computation power required overall and to increasing the detection rate of the classifier/person tracker.

In an alternative refinement, however, it is also conceivable to already have the classifier and possibly the person tracker running if no foreign object has yet been detected in the protection zone in order to detect persons as early as possible and possibly to "enable" access to the protection zone.

In a further refinement, a minimum distance to the machine is defined, with the machine being stopped if the identified person in the protection zone comes closer to the machine than the minimum distance.

This refinement improves the safeguarding by defining an absolute criterion for stopping the machine. Even if a person is in the protection zone as a result of the novel method and the corresponding device, this refinement ensures that a minimum safety distance with respect to the machine is always complied with. In the preferred exemplary embodiments, the respective current distance between the identified person and the machine is determined on the basis of a current machine position. Preferably, the evaluation unit therefore receives fail-safe data which represent the current position of the machine. In some exemplary embodiments, the fail-safe machine position may be provided by a fail-safe machine controller. In other exemplary embodiments, the current machine position can be determined using a—preferably fail-safe—camera-based machine position detector, the method of operation of which corresponds to that of the foreign object detector, for example. An example of a camera-based machine position detector is described in WO 2008/014909 A1. The refinement contributes to enabling close man-machine interaction.

In a further refinement, the minimum distance is varied on the basis of the machine movement.

In this refinement, the minimum distance is adaptively adjusted on the basis of the movement path, on the basis of the movement speed and/or on the basis of other parameters, for instance the moving mass of the machine. This refinement enables yet closer man-machine interaction with very flexible and situation-dependent safeguarding.

In a further refinement, the machine is operated at a reduced speed and/or with a modified movement path if the second signal is present.

The second signal is generated by the classifier if the foreign object in the protection zone is identified as a person. According to this refinement, the identification of a person results in the machine being operated in a manner adapted to the presence of the person in the working area. The safeguarded machine reacts to the presence of the person in the protection zone but without entirely stopping the automated movement. The refinement contributes to increased productivity since unnecessary stops in the working movement of the machine are avoided. At the same time, this refinement favors the desired safeguarding of the hazardous working area in order to protect persons.

It goes without saying that the features mentioned above and the features yet to be explained below can be used not only in the respectively stated combination but also in other combinations or alone without departing from the scope of the present invention.

BRIEF DESCRIPTION OF THE DRAWINGS

Exemplary embodiments of the invention are illustrated in the drawing and are explained in more detail in the following description. In the drawing.

DESCRIPTION OF PREFERRED EMBODIMENTS

Figure 1:
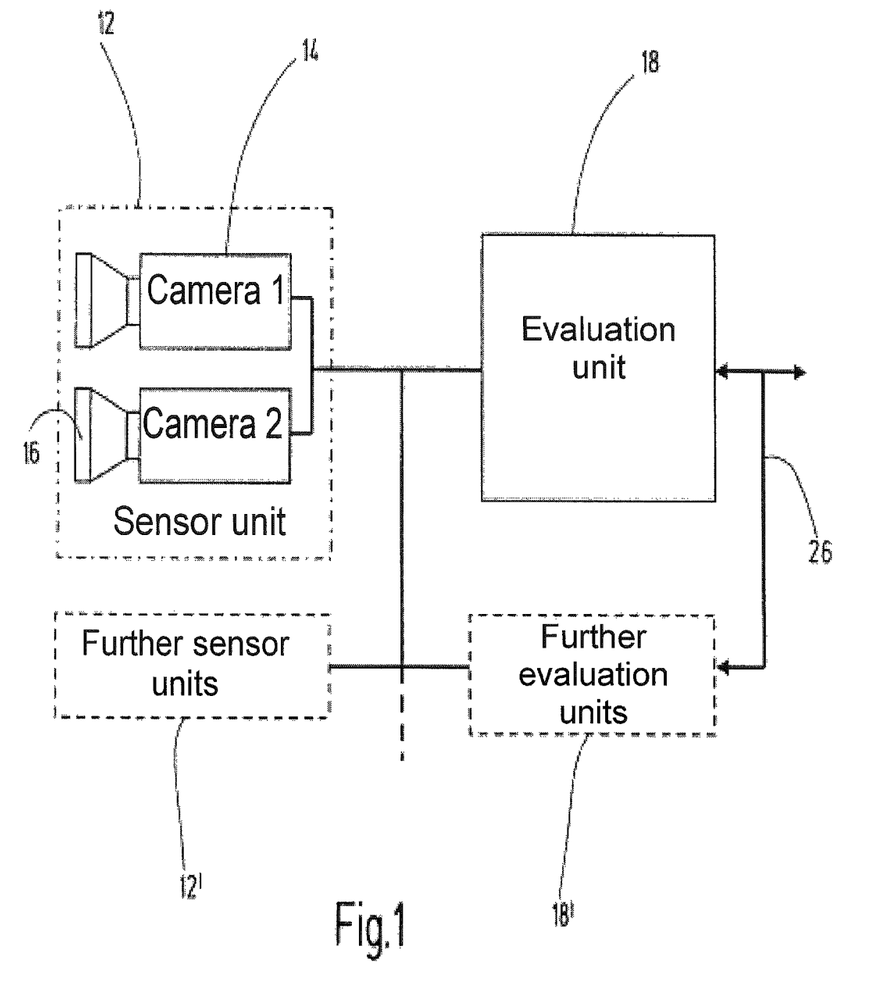
FIG. 1 shows a simplified schematic illustration of a sensor unit and an evaluation unit of the novel device.
Figure 2:
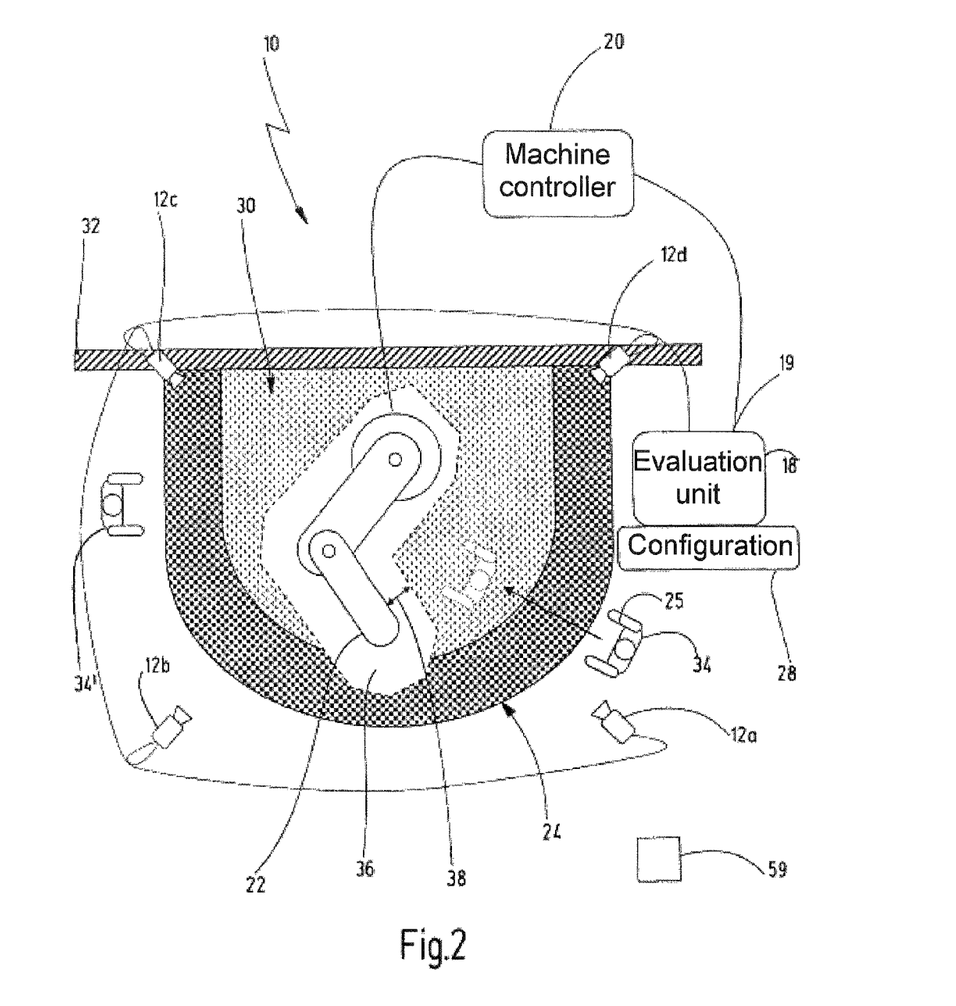
FIG. 2 shows a schematic illustration of an exemplary embodiment of the novel device in a plan view from above.

In FIGS. 1 and 2, a preferred exemplary embodiment of the novel device is denoted in its entirety with the reference numeral 10.

The device 10 comprises at least one sensor unit 12 which is designed to provide a respective current 3-D image of the hazardous working area of an automated machine at defined intervals of time. In one preferred exemplary embodiment, the sensor unit 12 is a stereo camera system having at least a first camera 14 and a second camera 16. The cameras 14, 16 provide two images of the working area to be safeguarded, which images are slightly offset with respect to one another. On account of the (known) offset between the cameras 14, 16 and using trigonometric relationships, the distance between the sensor unit 12 and objects in the working area can be determined using the camera images. A preferred sensor unit is described in US 2005/207618 A which was mentioned at the outset and which is completely incorporated here by reference.

In other exemplary embodiments, the sensor unit 12 may comprise a time-of-flight camera. This is be understood as meaning a camera which provides, on the one hand, 2-D images of an area to be monitored. In addition, the camera provides distance information which is obtained by a time-of-flight measurement. In addition, the sensor unit 12 may be in the form of a 3-D scanner and/or may use another technology which makes it possible to generate 3-D images of a working area to be safeguarded.

In some exemplary embodiments, the device 10 may comprise a plurality of sensor units 12, as illustrated in FIG. 2 with respect to sensor units 12a, 12b, 12c, 12d. In addition, in other exemplary embodiments, a plurality of 1-D and/or 2-D sensors may form, in pairs and/or as a whole, a 3-D sensor unit which provides the required 3-D images of the working area. It is therefore not necessary, although preferred, to use a stereo camera system as sensor unit for the novel device.

The device 10 also comprises an evaluation unit 18 which is coupled to a machine controller 20 in preferred exemplary embodiments. The machine controller 20 controls an automated machine which is schematically illustrated as a robot 22 in FIG. 2. The novel device 10 and the novel method are particularly suitable for safeguarding the hazardous working area 24 of a robot 22. However, the method and the device are not restricted to safeguarding robots and may also be used, in principle, to safeguard hazardous working areas of other machines, for example for safeguarding automatic transport and conveyor sections, cranes, lifting tools, presses, machining centers and the like.

The device 10 may also comprise further sensor units 12', for instance an RFID reader, which can be used to detect and evaluate a so-called RFID tag 25. In advantageous exemplary embodiments, such an RFID tag can be used to identify an operator 34 who is allowed to stay in the hazardous working area 24 of an automated machine in order to set up a new work process, to carry out maintenance or testing work and/or as part of other man-machine interaction, for example.

As illustrated in FIG. 1, the device 10 may comprise a plurality of evaluation units 18, 18' which are connected to one another via a bus 26 or another communication medium. In addition, it is possible for some of the signal and data processing power of the sensor unit 12 to be accommodated in the evaluation unit 18. For example, the position of an object can be determined using the stereo images from the cameras 14, 16 in a computer which also implements the evaluation unit 18, with the result that the sensor unit 12 in the sense of the present invention need not necessarily be accommodated in a housing which is physically separate from the evaluation unit. Rather, the sensor unit in terms of the invention can also be distributed among a plurality of subassemblies and/or housings even though it is preferred to implement the sensor unit in as compact a manner as possible.

Reference numeral 28 designates a configuration unit which can be used to define a protection zone 30 in the working area 24 of the robot 22. A preferred example of such a configuration unit 28 is disclosed in the international patent application US 2009/015663 A, which is incorporated here by reference. Accordingly, the configuration unit may be a PC on which a user can create virtual protection zones in a 3-D image of the working area 24 using a configuration tool. On the basis of the created protection zones, the configuration tool generates 3-D protection zone data which are made available to the evaluation unit 18. On the basis of the protection zone data provided, the evaluation unit 18 "knows" which parts of the working area 24 are defined as a protection zone in terms of the present invention.

It is possible for a user to define a plurality of protection zones inside the working area 24. In some exemplary embodiments, a plurality of protection zones may be staggered from the outside inward in order to define, for example, an outer warning zone and an inner switch-off area around the robot 22. It is also possible to define virtual protection zones at different heights and/or at different locations in order to safeguard open access to the robot 22, for example. The virtual protection zones may be combined with mechanical barriers, such as a protective fence or a wall 32.

Reference numeral 34 designates a (first) person who approaches the robot 22 and enters the protection zone. The person 34 is identified using the novel device and the novel method, as explained in more detail below using FIG. 3.

The novel method and the novel device are able to detect the entry of a plurality of persons into the protection zone 30, as indicated, by way of example, at reference numeral 34' in FIG. 2. In the preferred exemplary embodiments, the same method as when the first person 34 enters takes place when a second person 34' enters the protection zone 30. The speed of the robot 22 is preferably reduced as soon as a first person 34 enters the protection zone 30, and the robot 22 continues to operate at a reduced speed.

The position of the robot 22 and the position of the person 34 are repeatedly determined at defined intervals of time and a check is carried out in order to determine whether the person 34 and the robot 22 come too close to one another. The area 36 (illustrated in white in FIG. 2) around the robot 22 here symbolizes a minimum distance 38 which must always be complied with by the person 34 with respect to the robot 22. If the person 34 approaches the robot 22 to such an extent that the minimum distance 38 is undershot, this is detected using the evaluation unit 18. In this case, the evaluation unit 18 generates a control signal, on account of which the machine controller 20 immediately stops the working movement of the robot 22. The area 36 thus defines a type of minimum protective sheet in which the robot 22 moves and which cannot be entered by a person 34 in the preferred exemplary embodiments without this resulting in an immediate emergency stop of the robot 22. On the other hand, the robot 22 can operate at a reduced speed even if the person 34 stays in the working area 24 and, in particular, in the protection zone 30. In preferred exemplary embodiments, the size of the protective sheet 36 is determined on the basis of the movement speed and/or direction of the robot 22 (more generally of a machine). For this purpose, in some exemplary embodiments, the evaluation unit receives fail-safe data from the machine controller 20, which data represent the current movement speed and/or direction.

If the second person 34' enters the protection zone 30 after the first person 34 has already entered the protection zone 30, nothing changes in the working movement of the robot 22 as long as the minimum distance 38 from both persons 34, 34' is complied with. If both persons have left the protection zone 30, this is detected by the evaluation unit 18 using the sensor unit(s) 12. The evaluation unit 18 generates a corresponding control signal for the machine controller 20. In the preferred exemplary embodiments, the robot 22 then continues its working movement at a high speed without manual acknowledgement previously being required.

Figure 3:
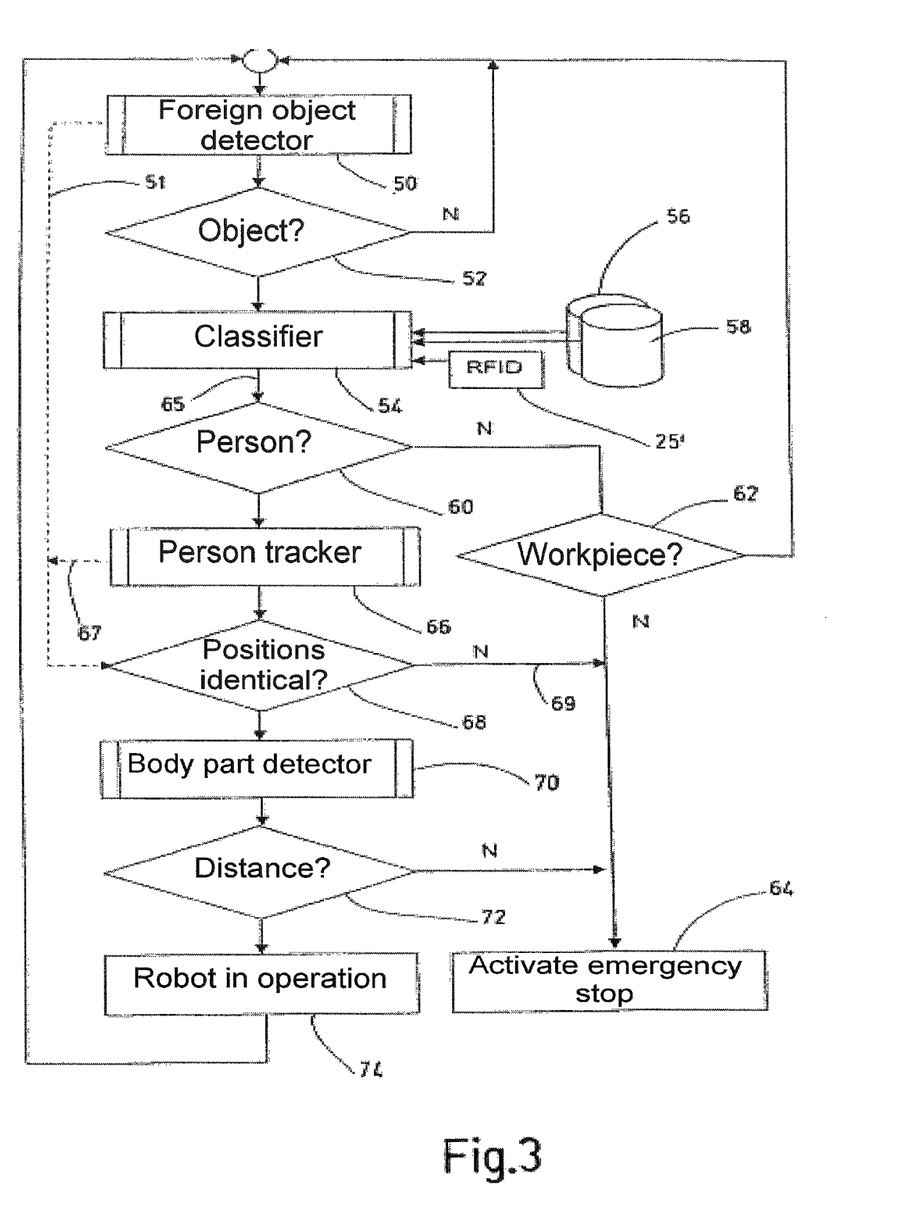
FIG. 3 shows a flowchart for explaining an exemplary embodiment of the novel method.

One preferred exemplary embodiment of the novel method is described below with reference to FIG. 3. The method according to FIG. 3 is carried out using the device 10 from FIG. 2.

According to step 50, the novel method uses a foreign object detector which, on the basis of a current 3-D image, generates a signal 51 which comprises position information relating to all objects detected in the protection zone 30. As has already been mentioned further above, the foreign object detector 50 comprises, in one preferred exemplary embodiment, two diverse, redundant 3-D scene analysis methods according to US 2005/207618 A, using which fail-safe object detection and position determination are possible. If the foreign object detector 50 does not detect a foreign object 34 in the protection zone 30, the method returns to the starting point according to step 52, i.e. a new monitoring cycle using a new 3-D image is started.

If, however, a foreign object is detected in the protection zone 30 by means of the foreign object detector 50, a classifier starts in the preferred exemplary embodiment according to step 54. The classifier 54 checks whether the detected foreign object 34 is a person. In preferred exemplary embodiments, the classifier 54 can use databases 56, 58. In the present exemplary embodiment, the database 56 stores personal data which characterize selected, defined persons. In this exemplary embodiment, the working movement of the robot 22 is allowed as long as one of the selected persons enters the protection zone 30. If it is indeed a person but said person is not known or does not belong to the selected persons, the working movement of the robot 22 is stopped. Alternatively or additionally, a warning or alarm signal can be generated.

In this exemplary embodiment, the database 58 comprises parts data which characterize a number of selected parts 59. The parts 59 are, for example, workpieces which must be fed into the protection zone 30 for machining.

According to step 60, a check is carried out in order to determine whether the foreign object 34 is a (known) person. If this is not the case, a check is carried out according to step 62 in order to determine whether the detected foreign object is a selected part 59. If this is the case, the detected foreign object is identified as a selected part, the presence of which in the protection zone 30 is permissible. Accordingly, the method returns to the starting point in order to begin a new monitoring cycle. However, if the detected foreign object is not a selected part, an emergency stop of the robot 22 is activated according to step 64.

If the detected foreign object is a (known) person, a person tracker is started according to step 66, which person tracker tracks the identified person using a series of respective current 3-D images. The person tracker 66 generates an item of position information 67 which represents the current position of the identified person in the protection zone 30.

The classifier 54 and the person tracker 66 may be implemented, for example, using the methods described in U.S. Pat. No. 8,154,590, which is a family member of DE 10 2006 048 166 A1, and/or DE 10 2009 031 804 A1 mentioned at the outset (each with numerous further references). Accordingly, the disclosure of these documents are incorporated here by reference.

In some exemplary embodiments, a plurality of different methods may be used to identify and track persons, although this is used in preferred exemplary embodiments solely to increase the detection rate and reduce false alarms but not to implement fail-safety. In some exemplary embodiments, the classifier 54 and the person tracker 66 are therefore non-fail-safe in terms of the relevant machine safety standards. For example, the classifier 54 and the person tracker 66 do not meet the requirements according to SIL 2 and/or PL(d). This means that, after detailed failure analysis, it is not possible to preclude with sufficient probability that the person identification and, in particular, the position determination for the identified person are correct.

According to step 68, a check is carried out in order to determine whether the first item of position information from the foreign object detector 50 and the second item of position information from the person tracker 66 each represent identical positions. If this is the case, the position of the identified person determined in a non-fail-safe manner is verified by the position of the foreign object detector 50 determined in a fail-safe manner. The position of the person determined by the person tracker 66 can consequently be processed further as fail-safe position information. In contrast, if the comparison in step 68 reveals that the positions are not identical, the emergency stop of the robot 22 is activated according to step 64.

In preferred exemplary embodiments, the position information can be compared using comparison features which are representative of the respective determined position. For example, the position of the identified person on the floor of the protection zone 30 can be compared with the corresponding position of the detected foreign object on the floor of the protection zone 30. Alternatively or additionally, the positions of the vertical and horizontal main axes of the foreign object and of the identified person 34 can be compared with one another.

In the preferred exemplary embodiment, body part detection and the determination of further items of position information representing the position of individual body parts of the identified person are then carried out according to step 70. In particular, the position of outstretched arms/hands and/or outstretched legs is determined using the body part detector 70. A suitable method is described in DE 10 2009 031 804 A1 which has already been mentioned and in further sources cited there.

According to step 72, a check is then carried out in order to determine whether the identified person—possibly taking into account the position of his body parts—complies with the minimum distance 38 relating to the robot 22. If this is not the case, the immediate emergency stop 64 is likewise activated. Otherwise, the robot 22 remains in operation according to step 74 and the method returns to the starting point in order to run through a new monitoring cycle. In the preferred exemplary embodiment, operation 74 can be executed at a reduced speed. Furthermore, the movement path of the robot 22 may be modified on the basis of the position of the identified person. The evaluation unit 18 generates corresponding control signals for the machine controller 20.

The classifier 54, the person tracker 66 and the body part detector 70 are illustrated as separate steps or blocks in the flowchart according to FIG. 3. In preferred practical implementations, these steps are software modules which together form a computer program that is executed in the evaluation unit(s) 18, 18' of the device 10. Accordingly, in at least some exemplary embodiments, the signals, for instance the first signal 51, the second signal 65 and the position information 67 from the person tracker 66, are digital data which are generated during the execution of a computer program.

The present invention therefore describes a new approach for using complex methods, such as person identification and tracking in particular, in a safety-oriented system which is used to safeguard the hazardous working movement of a machine and must accordingly meet high requirements which cannot be met by the complex methods per se. On account of the new approach, failure of or a fault in the complex methods does not result in a hazardous situation. The fail-safety of the novel method and the novel device is based on already proven principles, in particular on fail-safe foreign object detection and fail-safe position determination for detected foreign objects. However, on account of the new approach, the rigid boundaries between man and machine which hitherto had to be complied with for safety reasons can be prized open in order to enable flexible interaction between man and machine. Movement sequences and speeds of machines, in particular robots, can be dynamically changed on the basis of the identification and localization of persons and can be adapted to the respective operating situation. "Open" production systems can therefore be implemented.

In the preferred exemplary embodiments, the classifier and the person tracker operate according to an active principle, i.e. a person must be cyclically recognized and verified using the fail-safe position of the foreign object detector. Otherwise, the machine is transferred into a safe state, which is referred to as an emergency stop within the scope of the present invention.

If two persons enter the protection zone together (close behind each other) and/or if a person brings an object into the protection zone without the two objects being able to be separated, the two objects are handled as an one object. This is acceptable in terms of safety, especially because the two objects cannot be distinguished from one another with respect to their position. If the objects separate, either because the two persons separate or because one person puts the object down, the separate objects are detected as individual objects. Since the foreign object detector 50 monitors the entire protection zone 30 in the preferred exemplary embodiments, an emergency stop is immediately effected, if necessary, as explained with reference to FIG. 3.

In preferred exemplary embodiments in which a body part detector 70 is used, an additional plausibility check is advantageously carried out using the position information from the body part detector. If the plausibility check reveals discrepancies, the emergency stop is likewise activated in the preferred exemplary embodiments. Alternatively, a graduated response may be given, for example first of all the generation of a warning signal. In addition, the response may also be made dependent on whether the plausibility check in the next cycle results in matching position information in order to reduce the false alarm rate with sufficiently short cycle times.

What is claimed is:

1. A method for safeguarding a hazardous working area of an automated machine, comprising the steps of:
   providing at least one sensor unit which provides a respective current 3-D image of the working area at defined intervals of time,
   defining at least one protection zone in the working area,
   cyclically monitoring the protection zone using a failsafe, redundant foreign object detector which generates a first signal on the basis of the respective current 3-D image and the defined protection zone if a foreign object is detected in the protection zone, the first signal comprising a first item of position information which is representative of a position of the foreign object in the protection zone,
   cyclically classifying the foreign object in the protection zone using a classifier, the classifier generating a second signal if the foreign object is identified as a person, wherein the machine is operated on the basis of the first signal and the second signal,
   tracking an identified person over a series of the respective current 3-D images using a non-failsafe, non-redundant person tracker algorithm, the person tracker algorithm determining, after each new 3-D image, a second item of position information which represents a current position of the identified person in the protection zone, and
   comparing the first and second items of position information in order to determine whether the first item of position information from the foreign object detector and the second item of position information from the person tracker algorithm each represent identical positions,
   wherein the machine is stopped if the position of the foreign object according to the first item of position information and the position of the identified person according to the second item of position information are different from one another.

2. The method of claim 1, wherein the machine is also stopped if the classifier does not identify the foreign object as a person, and wherein the machine is allowed to continue operation if the classifier identifies the foreign object as a person.

3. The method of claim 2, wherein the classifier has a personal database containing personal data which characterize a number of selected persons, and wherein the machine is only allowed to be operated if the classifier identifies the foreign object, using the personal data, as one of the selected persons.

4. The method of claim 2, wherein the classifier comprises an RFID reader which is used to read an RFID tag identifying a selected person.

5. The method of claim 1, wherein the classifier further comprises a parts database containing parts data which characterize a number of selected parts, and wherein the machine is continued to be operated if the classifier identifies the foreign object, using the parts data, as a part which is allowed to enter the protection zone.

6. The method of claim 1, wherein the classifier comprises a body part detector which is used to determine a position of body parts of the identified person.

7. The method of claim 1, wherein the classifier has a non-failsafe, non-redundant design.

8. The method of claim 1, wherein the classifier is inactive until the foreign object detector detects a foreign object in the protection zone.

9. The method of claim 1, wherein the classifier is already active before the foreign object detector detects a foreign object in the protection zone.

10. The method of claim 1, wherein a minimum distance to the machine is defined, and wherein the machine is stopped if the identified person in the protection zone comes closer to the machine than the minimum distance.

11. The method of claim 10, wherein the minimum distance is varied depending on a current machine movement.

12. The method of claim 1, wherein the machine is operated with at least one of a reduced speed and a modified movement path if the second signal is present.

13. A device for safeguarding a hazardous working area of an automated machine, comprising:
- a sensor unit configured to generate a respective current 3-D image of the working area at defined intervals of time,
- a configuration unit for defining at least one protection zone in the working area, and
- an evaluation unit which has a foreign object detector, a classifier, a person tracker, a comparator and an output stage,
- wherein the foreign object detector has a failsafe, redundant design and is configured to cyclically generate a first signal on the basis of a respective current 3-D image and on the basis of the defined protection zone if a foreign object is detected in the protection zone, the first signal comprising a first item of position information which is representative of a position of the foreign object in the protection zone,
- wherein the classifier is designed to cyclically generate a second signal if the foreign object is identified as a person,
- wherein the person tracker has a non-failsafe, non-redundant design and is configured to track an identified person over a series of the respective current 3-D images and, after each new 3-D image, to determine a second item of position information which represents a current position of the identified person in the protection zone,
- wherein the comparator is designed to compare the first and second items of position information in order to determine whether the first item of position information from the foreign object detector and the second item of position information from the person tracker each represent identical positions, and to generate a third signal on the basis thereof, and
- wherein the output stage is designed to generate a control signal for stopping the machine on the basis of the second signal and on the basis of the third signal, the control signal being designed to stop the machine if the position of the foreign object according to the first item of position information and the position of the identified person according to the second item of position information are different from one another.

14. A computer program product comprising a non-transitory data storage medium storing program code which, when executed by a processor, causes a computer to carry out a method for safeguarding a hazardous working area of an automated machine, the method comprising the steps of:
- providing at least one sensor unit which provides a respective current 3-D image of the working area at defined intervals of time,
- defining at least one protection zone in the working area,
- cyclically monitoring the protection zone using a failsafe, redundant foreign object detector which generates a first signal on the basis of the respective current 3-D image and the defined protection zone if a foreign object is detected in the protection zone, the first signal comprising a first item of position information which is representative of a position of the foreign object in the protection zone,
- cyclically classifying the foreign object in the protection zone using a classifier, the classifier generating a second signal if the foreign object is identified as a person, wherein the machine is operated on the basis of the first signal and the second signal,
- tracking an identified person over a series of the respective current 3-D images using a non-failsafe, non-redundant person tracker algorithm, the person tracker algorithm determining, after each new 3-D image, a second item of position information which represents a current position of the identified person in the protection zone, and
- comparing the first and second items of position information in order to determine whether the first item of position information from the foreign object detector and the second item of position information from the person tracker algorithm each represent identical positions,
- wherein the machine is stopped if the position of the foreign object according to the first item of position information and the position of the identified person according to the second item of position information are different from one another.

* * * * *